US009755458B2

(12) United States Patent
Frampton (10) Patent No.: US 9,755,458 B2
(45) Date of Patent: Sep. 5, 2017

(54) BUS RECOVERY AFTER OVERLOAD

(71) Applicant: Kohler Co., Kohler, WI (US)

(72) Inventor: Isaac S. Frampton, Strattanville, PA (US)

(73) Assignee: Kohler, Co., Kohler, WI (US)

( * ) Notice: Subject to any disclaimer, the term of this patent is extended or adjusted under 35 U.S.C. 154(b) by 596 days.

(21) Appl. No.: 14/134,786

(22) Filed: Dec. 19, 2013

(65) Prior Publication Data

US 2015/0180280 A1 Jun. 25, 2015

(51) Int. Cl.
*H02J 9/08* (2006.01)
*H02H 7/06* (2006.01)
*H02J 3/48* (2006.01)
*H02J 3/38* (2006.01)

(52) U.S. Cl.
CPC .............. *H02J 9/08* (2013.01); *H02H 7/062* (2013.01); *H02J 3/38* (2013.01); *H02J 3/381* (2013.01); *H02J 3/48* (2013.01); *Y10T 307/555* (2015.04)

(58) Field of Classification Search
CPC .. H02H 7/062; H02J 3/38; H02J 3/381; H02J 3/48; H02J 9/08; Y10T 307/555
USPC .......................................................... 307/53
See application file for complete search history.

(56) References Cited

U.S. PATENT DOCUMENTS

| 3,300,647 A | 1/1967 | Gogia et al. | |
| 3,562,544 A * | 2/1971 | Reitan | H02P 9/102 |
| | | | 290/50 |
| 3,577,061 A * | 5/1971 | Wyles | H02P 9/08 |
| | | | 322/27 |
| 3,588,519 A | 6/1971 | Luebrecht | |
| 3,631,258 A * | 12/1971 | Eisenstadt | H02H 7/062 |
| | | | 307/64 |

(Continued)

FOREIGN PATENT DOCUMENTS

| CN | 1230977 A | 10/1999 |
| CN | 2812065 Y | 8/2006 |

(Continued)

OTHER PUBLICATIONS

Translation for EP 0012219.*

(Continued)

*Primary Examiner* — Rexford Barnie
*Assistant Examiner* — Elim Ortiz
(74) *Attorney, Agent, or Firm* — Lempia Summerfield Katz LLC (57) ABSTRACT

A set of generators are connected in parallel using a generator bus. At least one of the generators is associated with a controller. The controller detects an overload condition on the generator bus caused by a load and disconnects an initial generator from the generator bus in response to the overload condition. The initial generator continues to run during the overload condition after disconnecting from the generator bus but alternator excitation may be removed from the initial generator. The controller initiates starting one or more additional generator without alternator excitation. The controller also initiates connecting the initial generator and the one or more additional generators to the generator bus connected to the load. Alternator excitation is applied to the initial generator and the one or more additional generator so that adequate power may be applied to the load.

19 Claims, 7 Drawing Sheets

(56) References Cited

U.S. PATENT DOCUMENTS

| | | | |
|---|---|---|---|
| 3,646,356 A | 2/1972 | Hoffman | |
| 3,673,488 A * | 6/1972 | Spiller | H02P 9/105 322/25 |
| 3,805,144 A * | 4/1974 | McSparran | H02H 7/065 322/25 |
| 4,321,645 A | 3/1982 | Thom et al. | |
| 4,476,395 A * | 10/1984 | Cronin | H02K 16/00 290/4 C |
| 4,488,198 A * | 12/1984 | Christen | H02H 7/062 307/20 |
| 4,761,563 A * | 8/1988 | Ross | H02J 3/38 307/64 |
| 4,953,052 A | 8/1990 | Cartlidge et al. | |
| 4,996,646 A * | 2/1991 | Farrington | H02H 3/00 307/132 E |
| 5,390,068 A | 2/1995 | Schultz et al. | |
| 5,497,332 A | 3/1996 | Allen et al. | |
| 6,191,500 B1 | 2/2001 | Toy | |
| 6,452,769 B1 | 9/2002 | Sohde et al. | |
| 6,628,103 B2 | 9/2003 | Sumiya et al. | |
| 7,042,110 B2 | 5/2006 | Mikhail et al. | |
| 7,228,206 B2 | 6/2007 | Kahle et al. | |
| 7,521,822 B2 | 4/2009 | Lorenz | |
| 7,745,949 B2 | 6/2010 | Yang et al. | |
| 7,816,813 B2 | 10/2010 | Yagudayev et al. | |
| 7,933,101 B2 | 4/2011 | Bourgeau et al. | |
| 7,936,086 B2 | 5/2011 | Yue et al. | |
| 7,944,068 B2 | 5/2011 | Wagoner et al. | |
| 8,519,565 B2 | 8/2013 | Dozier et al. | |
| 9,099,927 B2 * | 8/2015 | Choi | H02M 3/33561 |
| 2005/0200205 A1 | 9/2005 | Winn et al. | |
| 2009/0295231 A1 | 12/2009 | Gaffney et al. | |
| 2011/0295436 A1 | 12/2011 | Haynes et al. | |
| 2012/0053884 A1 * | 3/2012 | Batzler | H02J 9/08 702/122 |
| 2012/0063039 A1 | 3/2012 | Shah et al. | |
| 2012/0175876 A1 | 7/2012 | Pendray et al. | |
| 2013/0049479 A1 | 2/2013 | Hedquist | |
| 2013/0116847 A1 | 5/2013 | Frampton et al. | |

FOREIGN PATENT DOCUMENTS

| | | |
|---|---|---|
| EP | 0012219 A1 | 6/1980 |
| EP | 1006641 A2 | 6/2000 |
| WO | WO2013010577 A1 | 1/2013 |

OTHER PUBLICATIONS

European Office action for related European Application No. 14191576.9, dated May 12, 2015.

Mohamad et al., A Review on Islanding Operation and Control for Distribution Network Connected with Small Hydro Power Plant, 2011, Elsevier.

Chinese Office Action for Chinese Patent Application No. 201410778905.1 mailed Oct. 31, 2016.

* cited by examiner

BUS RECOVERY AFTER OVERLOAD

TECHNICAL FIELD

This disclosure relates in general to parallel generators, or more particularly, to a bus recovery after an overload condition is introduced on parallel generators.

BACKGROUND

Load shedding, in general, is a technique in which loads on an electrical system are removed. As a result, some loads receive power and some do not. The benefit is that the loads that do receive power, receive full power or adequate power, which may be preferred over all loads receiving power but none of the loads receiving full power or adequate power. Thus, in utility systems, load shedding is an orchestrated loss of power to avoid a brown out.

Load shedding may also be implemented in systems of parallel generators. When the load exceeds the capacity of the parallel generators, a device may switch loads on or off of the system. However, load shedding often requires that a load shed wire be installed on one or more of the generators. This installation is often not performed correctly or altogether omitted by technicians tasked with installing and maintaining the generators.

BRIEF DESCRIPTION OF THE DRAWINGS

Exemplary implementations are described herein with reference to the following drawings.

DETAILED DESCRIPTION

The following examples describe a system of parallel generators including one or more engine-generator sets. An engine-generator set, which may be referred to as a generator or a genset, may include an engine and an alternator or another device for generating electrical energy. One or more of the generators may be towable generators, portable generators, marine generators, industrial generators, residential generators or other standby generators, or any type of generator.

One or more of the generators may be electrically coupled through wiring to a bus. A controller may automatically and individually generate switch commands to couple and decouple the generators from the bus. The controller may be internal to or connected with one or more of the generators, included in a standalone device, in or connected with another device such as an automatic transfer switch, or in various other devices, locations, or connections.

The parallel generators may be electrically coupled to a variable load through the bus. The variable load may include a load with power demands that change and are not constant. The variable load may include multiple separate loads, any of which may be constant or variable, and any of which may be added or removed. As such, the variable load may vary in power demand based on variances in energy demanded by the load, by number or types of loads added or removed from the system, or both.

In one example, the system experiences a high load (a load requiring a large amount of power relative to other "low" loads), and two or more of the parallel generators may be coupled to and power the high load. After some time, the load changes to a low load. For example, portions of the load may be decoupled from the bus, or the load may decrease because the operations of a device connected to the bus may demand less power. In response to the lower load, one or more of the paralleled generators that were used to power the high load may be decoupled from the bus. This may leave a single generator (or fewer than the two or more generators used to power the high load) coupled to the bus to power the low load.

Subsequently, the load may increase to a high load that exceeds the capacity of the single generator (or multiple remaining generators) still coupled to the bus. Other generators may be started and coupled to the bus to meet the high load demand, but this process may take time. In one example, five to ten seconds may pass before a generator is started and reaches the generator's rated voltage and frequency for providing power to the bus. In the meantime, the single generator may remain connected to bus and attempt to supply the entire load. The single generator (or multiple remaining generators) may experience a failure before the other newly-started generators have time to get up to speed. To complicate matters, one or more of the additional newly-started generators may couple to the bus as the single generator experiences a failure, but the additional generators alone may also not be able to supply the full load after the fewer or first generator has failed. Therefore, the additional newly-started generators may also experience a failure. The failure may include a disconnection from the load, a shut down on a protective fault, or poor power quality provided to the load.

The following embodiments provide a system for a controlled bus recovery after overload. When a controller senses that one or more generators, but less than all of the generators, are overloaded, the one or more overloaded generators may be disconnected from the bus. The overload may also trigger the other generators in the system that have not been operating to start running but remain disconnected from the bus for a predetermined time period or until all of the generators are running at a predetermined level. At this point, all of the generators may be closed to the bus and supply power to the load.

Figure 1:
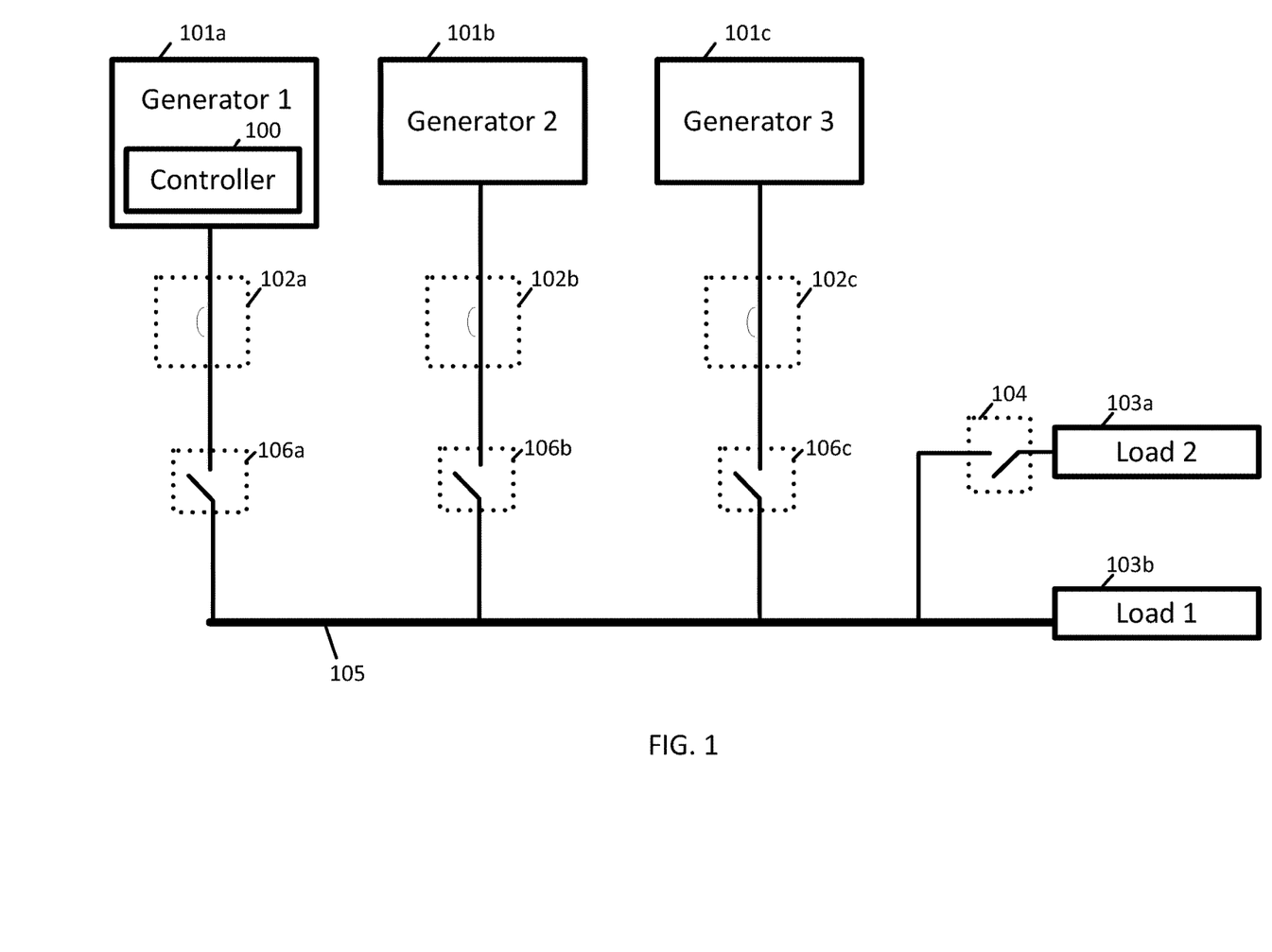
FIG. 1 illustrates an example system of parallel generators for bus recovery after overload.

FIG. 1 illustrates an example system of parallel generators for bus recovery after overload. The system may include a set of generators 101*a-c* connected to loads 103*a* and 103*b* via a generator bus 105. Each of the generators 101*a-c* may be coupled to one or both of a circuit breaker 102*a-c* and a switch 106*a-c*, which may control a connection of the generators 101*a-c* to the bus 105.

In some systems, two or more loads 103*a* and 103*b* may be connected with the bus 105 and powered by the generators 101*a-c*. The loads 103*a* and 103*b* may be various sizes, and may each be constant or variable. As an example, in some systems, load 103*b* may be a small load, and load 103*a* may be a large load, such as a large load that requires more power than any single generator 101*a-c* can supply at a given time. In other systems, only one load may be connected with the bus 105. Other variations are possible.

The size of the overall load connected with the bus 105 may vary, such as by adding or subtracting individual loads, or by a changing power demand of one or more loads. For example, in some systems, at least one of the loads, such as the large load 103a, may be selectively coupled to the generator bus 105 and the set of generators 101a-c, such as via a switch 104 or other device. As such, the overall load connected with the bus 105 may change with the position of the switch 104. In some examples, the overall load connected with the bus 105 may change with variations in the power demand of the loads connected with the bus 105. Other variations are possible. Additional, different, or fewer components may be included.

The generators 101a-c may be controlled by one or more controllers 100. The controller 100 may be, for example, a generator controller that is connected with a generator 101a, monitors one or more parameters of the generator 101a, and/or controls one or more operating parameters or aspects of the generator 101a. Each of the generators 101a-c may include an individual controller. The individual controllers may be independent of one another (i.e., that is the individual controllers of generators 101a-c may not be in communication with one another).

In one implementation, the generator 101a may include the only controller 100 of the system, and the controller 100 may acts as a master for the system. In another implementation, the controller 100 may be separate from, and connected with, a number of generators 101a-c. In another implementation, each of the generators 101a-c includes a controller 100. One of the controllers 100 may act as a master controller and the other controllers act as slave controllers. The master controller may instruct the slave controllers. The identity of the master controller may be constant and configured at installation, or may be set or adjusted at a later time automatically by the system or manually by a user. For example, the master controller may be the first controller to come online or close to the generator bus 105. In another implementation, the controller may be external to the generators.

In a system with a relatively constant large load 103a and small load 103b, the system may operate in various power demand states. For example, the system of parallel generators may be under a low power demand when only the small load 103b is coupled to the generator bus 105 and one (or less than all) of the generators 101a-c may be necessary to power the total load on the bus 105. As another example, the system of parallel generators may be under a high power demand when only the large load 103a is coupled to the generator bus 105. As still another example, the system of parallel generators may be under a highest power demand when both the small load 103b and the large load 103a are coupled to the generator bus 105 and all (or at least additional) generators may be necessary to power the total load on the bus 105. While the present system may be described with respect to these power demand states, it should be appreciated that in other systems with additional loads or variable loads, the system of parallel generators may operate in additional, fewer, and/or different power demand states.

In the state of low power demand or when the large load 103a is disconnected from the generator bus 105, only one (or less than all) of the generators 101a-c may be needed. However, when the large load 103a is reconnected, the total load may exceed the capacity of the generator 101a. Thus, an overload condition may exist at the generator 101a, and accordingly, at the generator bus 105. The overload condition may trip circuit breaker 102a, disconnecting the operating generator 101a (or generators) from the bus 105. Alternatively, the overload condition may cause the operating generator 101a (or generators) to disconnect excitation to the field coil. The excitation may be removed by disconnecting or grounding the field coil.

The overload condition may be detected using a variety of techniques. In one technique, the action of the circuit breaker 102a may generate an overload condition signal, which is received by the controller 100. Alternatively, a circuit or sensor may detect the operation of the circuit breaker 102a and generate the overload condition signal. In another technique, a controller at one or more of the generators 101a-c may monitor the load and the output of the generators 101a-c. When the load exceeds the output, the controller 100 may generate an overload condition signal. Either by receiving the overload condition signal from the generator bus 105 or the circuit breaker 102a, or by generating the overload condition signal internally, (or in another way), the controller 100 may detect the overload condition.

Upon detection of the overload condition, the controller 100 may control the switch 106 to disconnect the generator 101a from the bus 105. Though the generator 101a may be disconnected electrically from the generator bus 105, the generator 101a may continue to run. That is, the prime mover or shaft of the engine may continue to rotate after the generator bus 105 is electrically disconnected from the generator bus 105 and the load.

The controller 100 may generate a command to start another generator (e.g., generator 101b) or multiple additional generators. The generator 101b (or multiple generators) may be started without alternator excitation. The alternator excitation is the electric current that is supplied to the windings of field coils in the rotor and is used to generate a magnetic field. The rotor of the alternator spins, under the motive force of the engine. The magnetic field generated by current in the field coils of the rotor induces a voltage at the output of the generator. The alternator excitation may be internally supplied from the output of the generator through a switch that turns the alternator excitation on or off or a regulation device that regulates the voltage or current to the field coils. The alternator excitation may be separately excited by an external source. The external source may be another generator, a controller rectifier circuit, thyrister, a diode rectifier circuit or a battery. Any one of the external sources may be coupled to the field windings through a switch that turns the alternator excitation on or off or another regulation device. The battery may be charged by the generator. The source of alternator excitation may be a direct current (DC) source.

The controller 100 may also generate a command to remove the alternator excitation from the generator 101a. For example, the controller 100 may provide a command that instructs a switch connecting the source of the alternator excitation to turn off. The switch may be internal to the controller 100 in the case of self-excited alternators or an external switch in the case of the external source of excitation.

The controller 100 may initiate connecting the generator 101a and the generator 101b, or additional generators, to the generator bus 105 connected to the load. The generators may be connected to the generator bus 105 using one or more paralleling techniques. For example, the paralleling techniques may include any combination of an availability stage, a ready stage, and a synchronization stage. The controller 100 may send availability signals, ready signals, and excitation or synchronization commands to the generators 101a-c or to other controllers 100 for the generators 101a-c during the paralleling process.

During the availability stage, the controller 100 may determine whether another generator (e.g., generator 101b) is available. For example, the controller 100 may identify the number of generators in the system and ratings of the generators. As one example, the generator controller 100 (or each of the generator controllers 100, where the system includes more than one) may access a memory that includes the local configuration of the generator, which is transmitted to the controller 100. The configuration file may include a model number, a rated power, a rated speed, maintenance information, or other data. The controller 100 may access the local configurations to identify the generators and capabilities.

During the ready stage, the controller 100 may monitor the generators. For example, the controller 100 may monitor the speeds of the engines with tachometers. The controller 100 may additionally or alternatively monitor the output (e.g., voltage, current, or power) using a voltmeter, current transformer, dynamometer, or another device. The controller 100 may compare to the rated speed and/or the rated output to identify when the generator 101b, or another generator, is ready to be coupled to the generator bus 105. In systems with controllers 100 associated with each generator 101a-c, the controllers 100 may each perform this function for the associated generators.

During the synchronization stage, the generator 101b, or another generator, is coupled to or closed to the generator bus 105. The synchronization may be performed using active synchronization, passive synchronization, automatic paralleling or dead field paralleling.

Dead field paralleling may also be referred to as exciter paralleling or close before excitation. In dead field paralleling, the output breaker for each generator closes while the alternator rotor field current is turned off. The field may be disabled by shorting the coil to ground. The generator may be stopped, starting or running when the field is disabled. The field current is increased either by adding resistance between the coil and ground or another technique. The increase may be gradual and a predetermined rate. The predetermined rate may be set by the user or based on the configuration file. As the field current is increased, the engine could be increasing speed or already running at rated speed, and the generators are drawn into synchronism using torque generated by electromechanical forces within the alternator.

Active paralleling may be performed by one or more of the generator controllers. Active paralleling may include controlling the speed and/or voltage of a generator in order to bring the generator in synchronism with a paralleling bus that is energized from a utility, another generator, an uninterruptible power supply, or another power source. The generators 101a-c may be connected to the generator bus 105 in a predetermined order. The predetermined order may be stored by the master controller in a configuration file. Alternatively, the generators 101a-c may be connected to the generator bus 105 according to the order that the respective prime movers reach the rated speed, or a percentage of the rated speed. In one example, a flag is set while one of the generators 101a-c is being closed to the generator bus 105. The flag disables other generators from closing to the bus at substantially the same time. Various other examples are possible.

The controller 100 may also monitor the load. In one example, the size of each component of the load (e.g., large load 103a and small load 103b) may be a known quantity and may be stored in memory. For example, each component of the load may be a device having a rated power requirement. The controller 100 may be programmed with the rated power requirements of the components of the load. When the controller 100 receives switch signals (e.g., from switch 104), the controller 104 may calculate the load placed on the generator bus 105. Alternatively, the controller 100 may receive data (e.g., voltage, current, or power) from a load sensing device such as a voltmeter, current transformer, ammeter, or another device. In one alternative, the power requirements of the components of the load are developed and modified over time by the controller 100. The controller 100 may calculate an expected load based on the switch signals. The controller 100 may start additional generators in response to the expected load.

The controller 100 may determine the number of needed generators and/or which generators should be started and brought onto the generator bus 105 based on the power requirements of the load. For example, the controller 100 may compare the capacity of running generators (e.g., generator 101a and generator 101b) to the power requirement of the load. When the power requirement of the load exceeds the capacity of the running generators, the controller 100 may generate an error signal.

In one example, the error signal instructs the running generators to disconnect. The error signal may drive the switches 106a-b to switch off and decouple the generator 101a and generator 101b from the generator bus 105.

The error signal may define a suspension of the running generators. The suspension may be defined in terms of time duration or another condition for returning the running generators to the generator bus 105. The error signal may be a message that is transmitted to an administrative device or presented on a display. The error signal may be a command for controlling the excitation of the running generators or all of the generators.

Alternatively, the controller 100 may determine whether additional generators are available in response to the circuit breaker 102a for generator 101a tripping. When no additional generators are available, the controller 100 restarts the tripped generator without excitation and controls the tripped generator to dead field parallel connect to the generator bus 105. Other variations are possible.

In one implementation, the controller 100 may also perform a dead bus avoidance technique. The controller 100 monitors an operational characteristic of the generator 101a using a sensor for a non-fatal fault. Example operational characteristics include temperature, frequency, coolant level, or lubrication oil level. The controller 100 is configured to compare the operational characteristic to an initial threshold and/or a fatal threshold.

If the operational characteristic exceeds the initial threshold, the controller 100 may register the non-fatal fault in memory, generate an initiation command for another generator (e.g., generator 101b), and/or start a timer. The initiation command may instruct generator 101b (or another generator controller) to come online, couple to the bus 105, and replace generator 101a that has experienced a fault. However, the generator 101a is not immediately taken offline. Instead, the controller 100 keeps the original generator 101a coupled the bus 105 until the timer reached a predetermined time period. The predetermined time period (e.g., 10-20 seconds) may be selected to give generator 101b to reach rated output or frequency.

During the predetermined time period, the controller 100 may override the dead bus avoidance technique if the operational characteristic exceeds the fatal threshold. The fatal threshold is selected so that the generator 101a may be shut down in some scenarios even when the replacement generator is not yet up and running.

Figure 2:
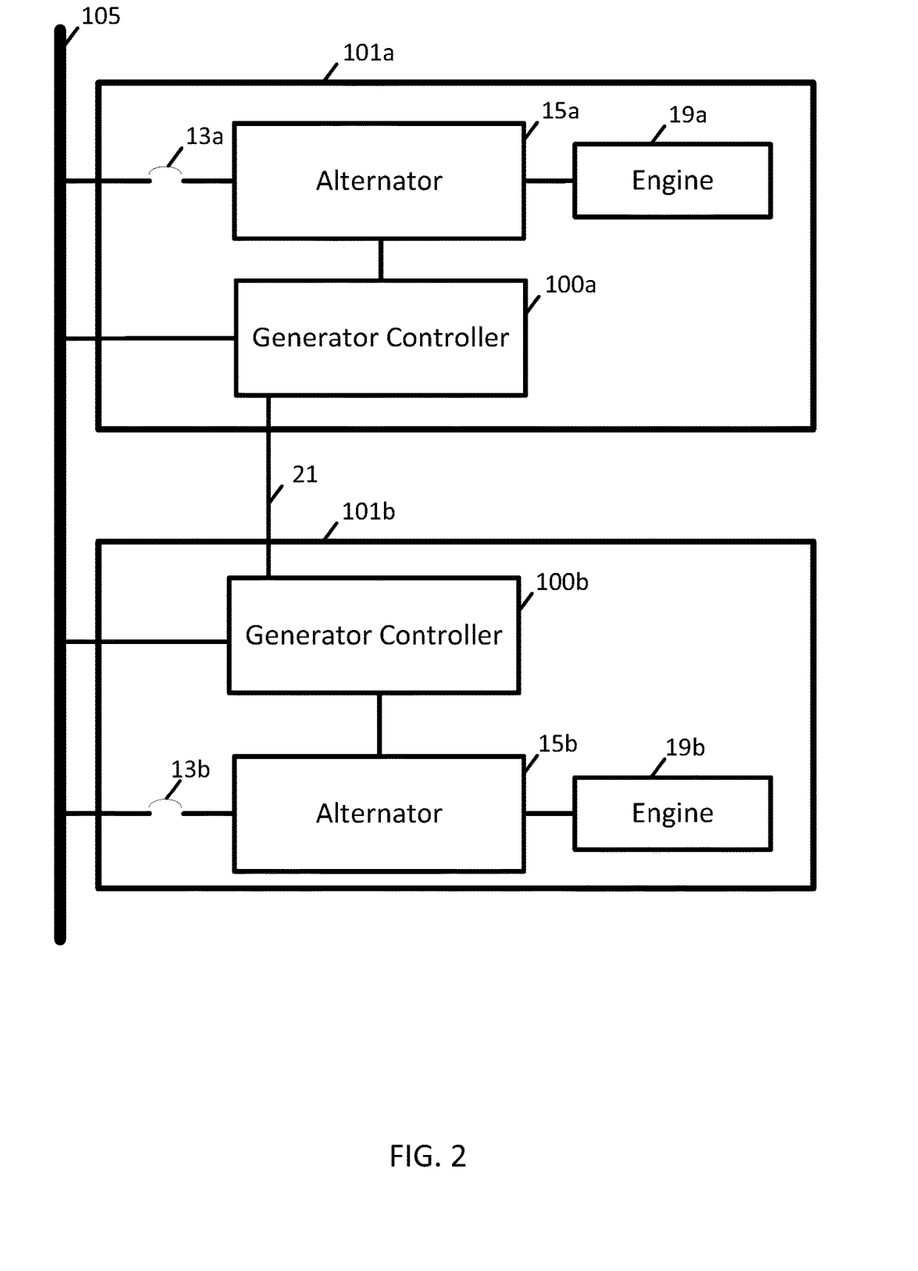
FIG. 2 illustrates an example generator controller and bus for the system of FIG. 1.

FIG. 2 illustrates a more detailed view of an example generator 101a and generator 101b of FIG. 1. The generators 101a-b may be the same, similar, or different. The generators 101a-b may each include one or more of internal circuit breakers 13a-b, alternators 15a-b, generator controllers 100a-b, and engines 19a-b. A communication line 21 may facilitate data communication between the generator controllers 100a-b. The communication may be Modbus or another protocol. The generators 101a-b may also include a fuel supply, a speed governor, a cooling system, an exhaust system, a lubrication system, and a starter. Additional, different, or fewer components may be included.

The alternators 15a and 15b may be electromechanical devices. The alternators 15a and 15b may include a rotating magnetic field and a stationary armature, a rotating armature with a stationary magnetic field, or a linear alternator. The engines 19a and 19b may be powered by gasoline, diesel fuel, or gaseous fuel. The gaseous fuel may be liquefied petroleum gas (LPG), hydrogen gas, natural gas, biogas, or another gas. The LPG may be or include primarily butane, primarily propane, or a mixture of hydrocarbon gases. The hydrogen gas may include hydrogen mixed with air or oxygen. The hydrogen gas may be mixed with another fuel when delivered to the engine. Natural gas (e.g., compressed natural gas (CNG)) may be a hydrocarbon gas mixture. Biogas may be a gas produced by the breakdown of organic material. Other variations are possible.

Figure 3:
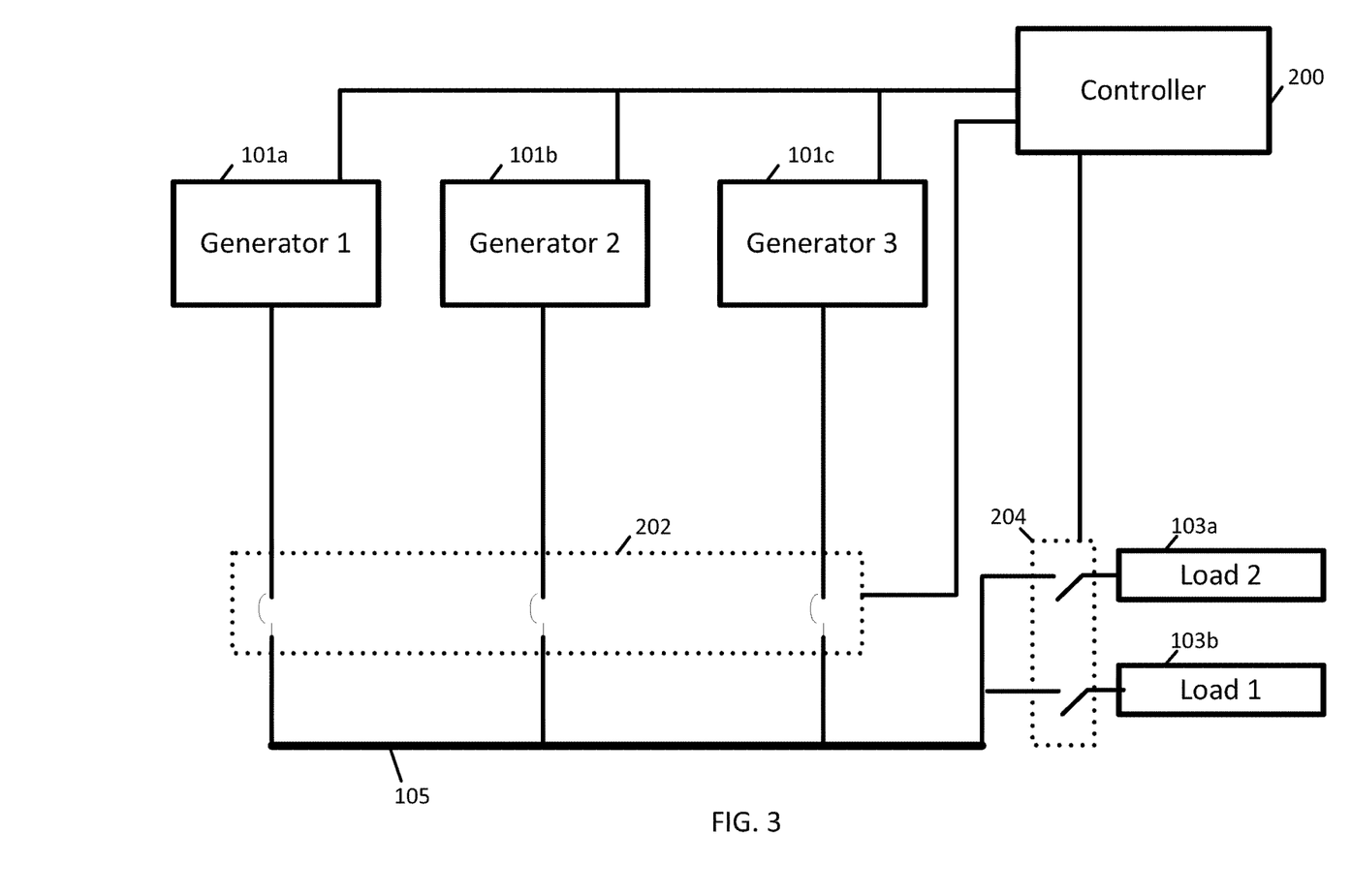
FIG. 3 illustrates an example system of parallel generators with a centralized controller.

FIG. 3 illustrates an example system of parallel generators for bus recovery after overload having a centralized controller 200. The centralized controller 200 may be coupled to each of one or more generators 101a-c, a generator switch array 202, and/or a load switch array 204. Additional, different, or fewer components may be included. The centralized controller 200 may perform any of the functions described above with respect to controller 100.

The communication between the controllers 100a-b through communication line 21 or the communication between the generators 101a-c and the centralized controller 200 may include information about settings of the generators or operation of the generators. The data communication may include configuration files reported from the slave generator controllers to the master controller. The data communication may include the current speeds, frequency, voltage, current, or power of each of the generators reported to the other generators. The data communication may include the circuit breaker states of respective generators. The data communication may include availability signals, ready signals, and excitation commands send between generators 101a-c or controllers 100 during synchronization or other paralleling techniques. Other variations are possible.

Figure 4:
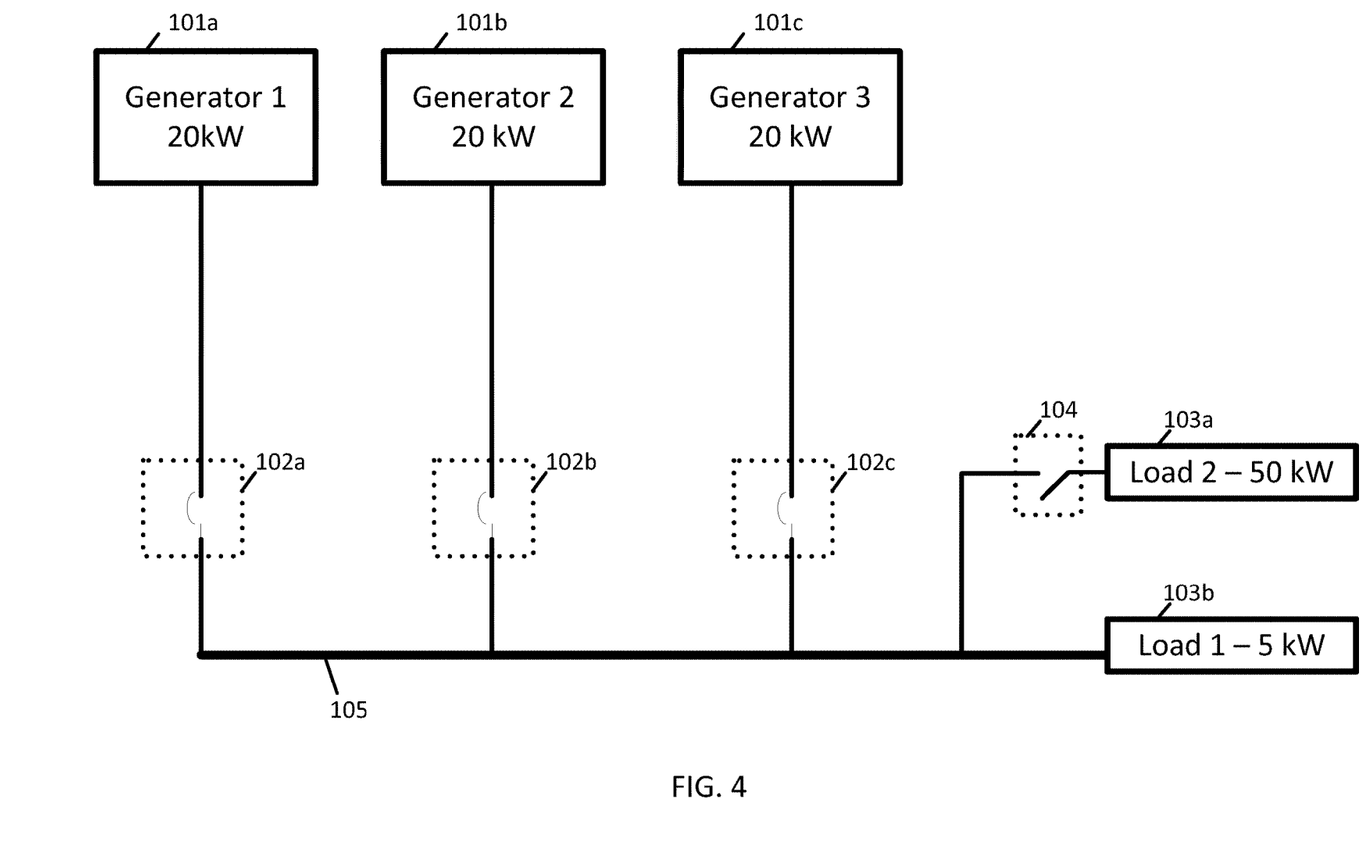
FIG. 4 illustrates an example implementation of the system of FIG. 1.

FIG. 4 illustrates an example implementation, including example power ratings and levels, of the system of FIG. 1. In the example of FIG. 4, the small load 103b has a designated power of a fraction of the designated power of the large load 103a. The small load 103b and/or the large load 103a in this example may be substantially constant loads. The value of the constant load is used for the designated load when constant loads are present. Examples of devices with substantially constant loads may include lights, fans, pumps, machine tools, or other device. The small load 103b and/or the large load 103a may be substantially variable loads. The maximum draw of the load may be used for the designated load when variable loads are present.

Each of the generators 101a-c may be designated at a power rating. The generators 101a-c may have different or the same power rating. In the example shown in FIG. 4, the power rating of each of the generators 101a-c is greater than the designated power of at least one of the loads (e.g., small load 103b) and smaller than the designated power of at least one of the loads (e.g., large load 103a). Thus, at least one load combination exists that any one of the generators 101a-c can adequately individually supply power to and at least one load combination exists that none of the generators 101a-c can adequately (at all times) individually supply power to.

As one example for illustrative purposes, the power ratings for each of the generators 101a-c may be 20 killowatt (kW), the designated power for the small load 103b may be 5 kW, and the designated power for the large load 103a may be 50 kW.

When fewer than all of the generators (in this example, one of the generators) are running and the total load is increased to a point that exceeds the capacity of the running generators, and the increased load is less than the sum of the capacity of a combination of the generators, an overload condition exists. The overload condition may be addressed using any of the embodiments described herein. In one example, one or more running generators are disconnected from the bus, and another generator is started without alternator excitation. When an adequate number of generators are up and running, the generators are reconnected to the bus and energized to supply power to at least the large load 103a.

Figure 5:
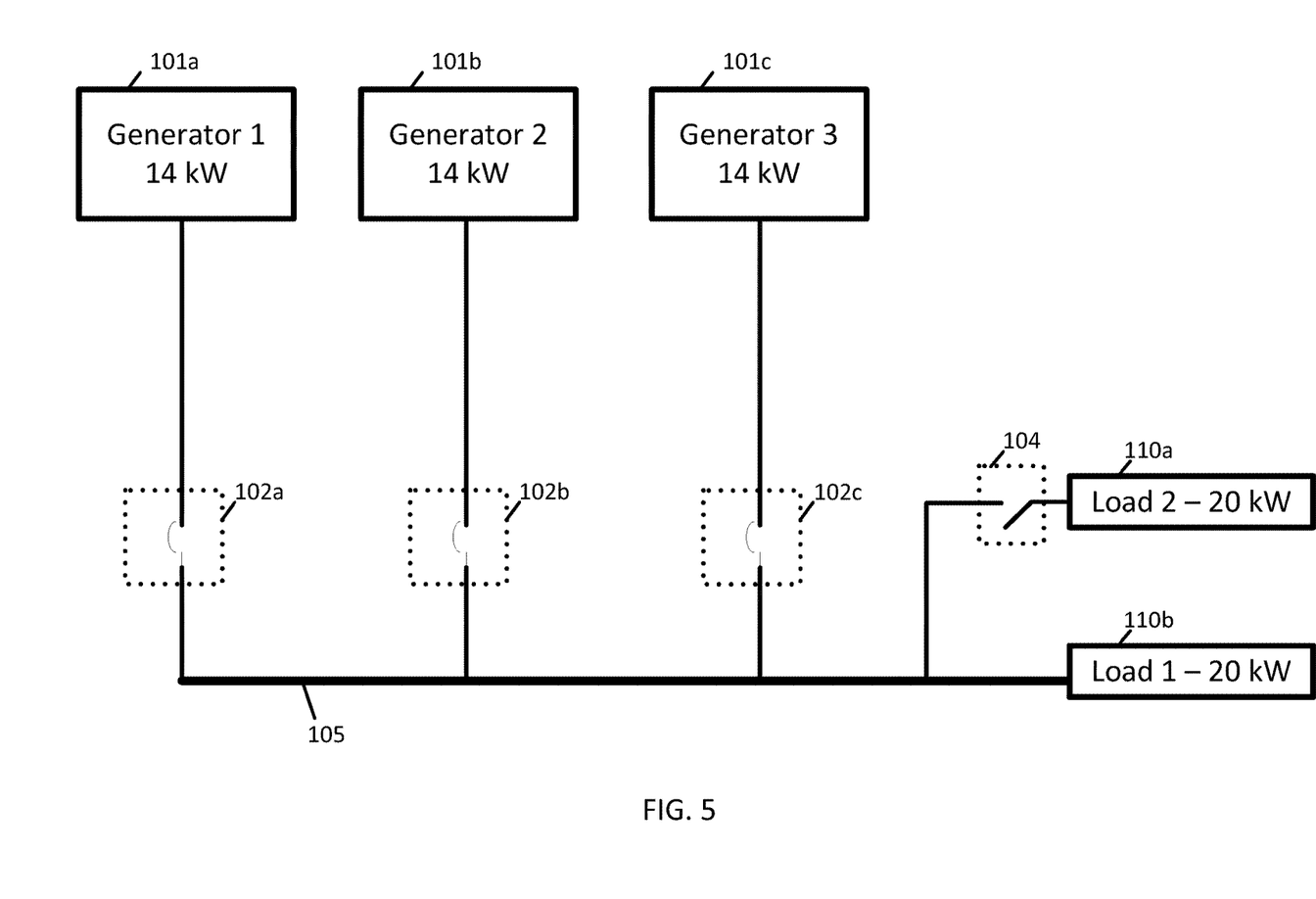
FIG. 5 illustrates another example implementation of the system of FIG. 1.

FIG. 5 illustrates another example implementation of the system of FIG. 1 in which the load components 110a-b are substantially equivalent. Accordingly, each of the power ratings for the generators 101a-c are either greater than or less than the designated power of the load components 110a-b. As one example for illustrative purposes, the power ratings for each of the generators 101a-c may be 14 kW, the designated power for each of the load components 110a-b may be 20 kW.

Accordingly, any two of generators 101a-c can adequately supply power to one of the load components 110a-b, but no two of the generators 101a-c can adequately supply power to both of the load components 110a-b. All three generators 101a-c are needed when both load components are switched onto the generator bus 105.

Figure 6:
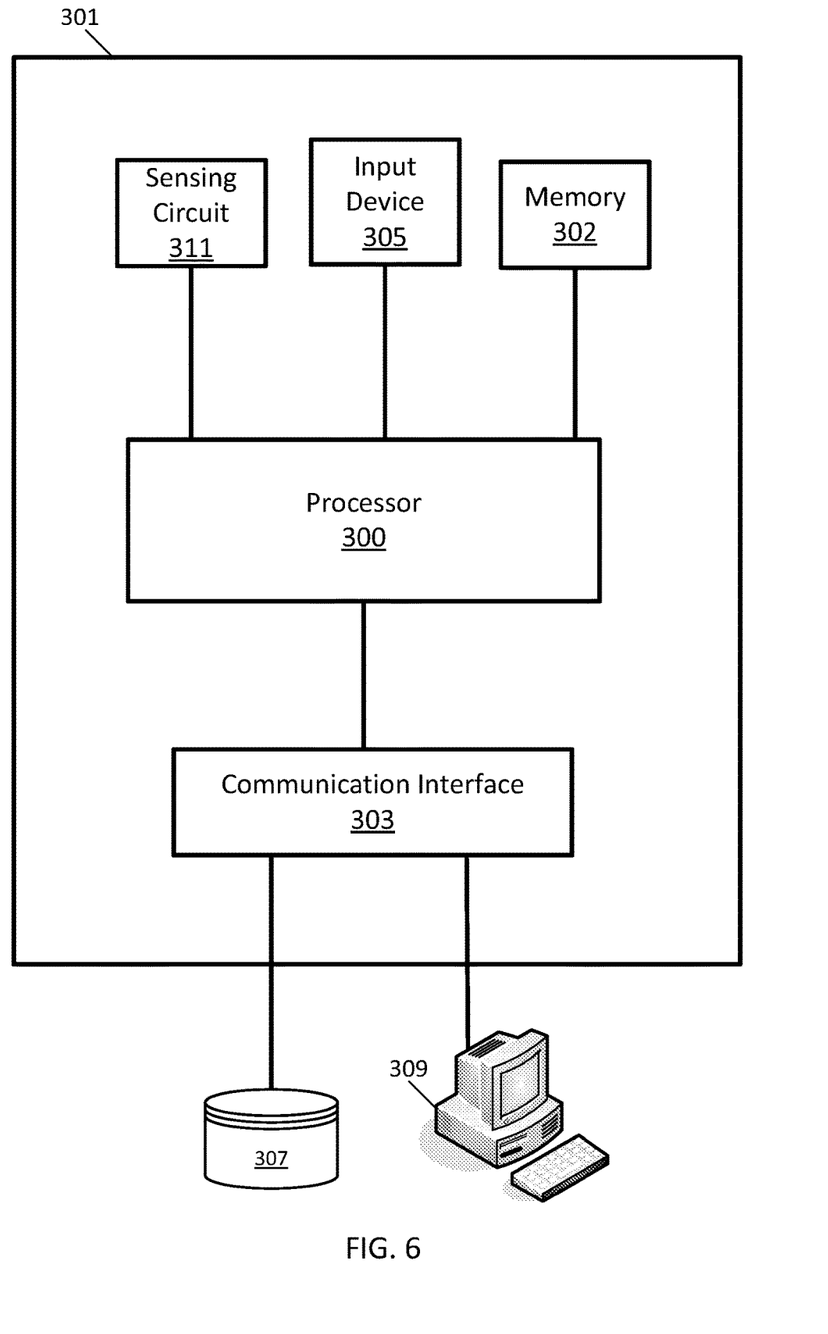
FIG. 6 illustrates an example controller of the systems of FIGS. 1-5.

FIG. 6 illustrates an example controller 301. The controller 301 may be the same, similar to, or different from the controllers 100 and 200, and may include the same, similar, or different components and logic. In one embodiment, the controller 301 is installed in an automatic transfer switch (ATS). The controller 301 may include a processor 300, a memory 302, and a communication interface 303. The controller 301 may be connected to a workstation 309 or another external device (e.g., control panel) and/or a database 307. Optionally, the controller 301 may include an input device 305 and/or a sensing circuit 311. Additional, different, or fewer components may be included.

The sensing circuit 311 may detect an overload condition caused by a load on an initial generator. The sensing circuit 311 may be an analog circuit designed to detect a change in status of a circuit breaker or switch. The sensing circuit 311 may pass a status signal from the circuit breaker to the processor 300. The overload condition may be the status of the circuit breaker. Alternatively, the overload condition may be detected from a switch array that connects one or more loads coupled to the generator bus. The sensing circuit 311 may also include the circuit breaker or other switch outside of the controller 301.

The processor 300 may generate a disconnection command to remove the initial generator from the generator bus in response to the overload condition. The disconnection command may energize a switch or set of switches. In other words, the processor 300 may cut the power to the load.

In addition, the processor 300 may generate an initiation command to start one or more additional generators. The engines of the generators may begin running (or accelerating) to a predetermined speed in response to the initiation command or another command from the processor 300. The processor 300 may generate an excitation removal command message to remove alternator excitation from the initial generator. The excitation removal command message causes the generator to activate a switch to remove power from the windings of the alternator or introduce a short to ground for the windings of the alternator.

The processor 300 may generate a backup generator command message to start a second generator without alternator excitation. The backup generator command message may be sent to other controllers or directly to the starter or throttle of the engine.

The processor 300 may monitor the one or more additional generators as the engine speeds of the running generators increase. Data indicative of the speeds of the engines may be received from the communication interface 303 from other controllers or directly from sensors for measuring the speeds of the engines. The processor 300 may compare the speeds of the engines to the predetermined speed and synchronize the generators when the engines reach the predetermined speed or a proportion of the predetermined speed.

Alternatively or in addition, the processor 300 may monitor the one or more additional generators as the output (e.g., voltage, current, power) of the additional generators increase. Data indicative of the output of the generators may be received from the communication interface 303 from other controllers or directly from sensors for measuring the outputs of the generators. The processor 300 may compare the speeds of the engines to the predetermined rated output and synchronize the generators when the engines reach the predetermined rated output or a proportion of the predetermined rated output.

The processor 300 may generate a connection message to connect the one or more additional generators to the generator bus. The connection message may be sent to other controllers or a central controller through the communication interface 303. When multiple additional generators are needed, multiple connection messages may be generated. The connection messages may be staggered in time to close the additional generators to the generator bus in a predetermined order. In one example, the processor 300 generates an excitation message that applies alternator excitation to additional generators. The excitation message or messages may be sent to other controllers or a central controller through the communication interface 303.

The controller 301 may communication with workstation 309 directly or through a network (e.g., the Internet). The workstation 309 may display data indicative of the overload condition (e.g., a fault at has occurred; load exceeds rater power), such as the error message generated by the controller 301. The workstation 309 may display the operating status of one or more of the generator sets (e.g., output, excitation, synchronization). The workstation 309 may display the capabilities of the generators and the requirements of the connected loads.

Figure 7:
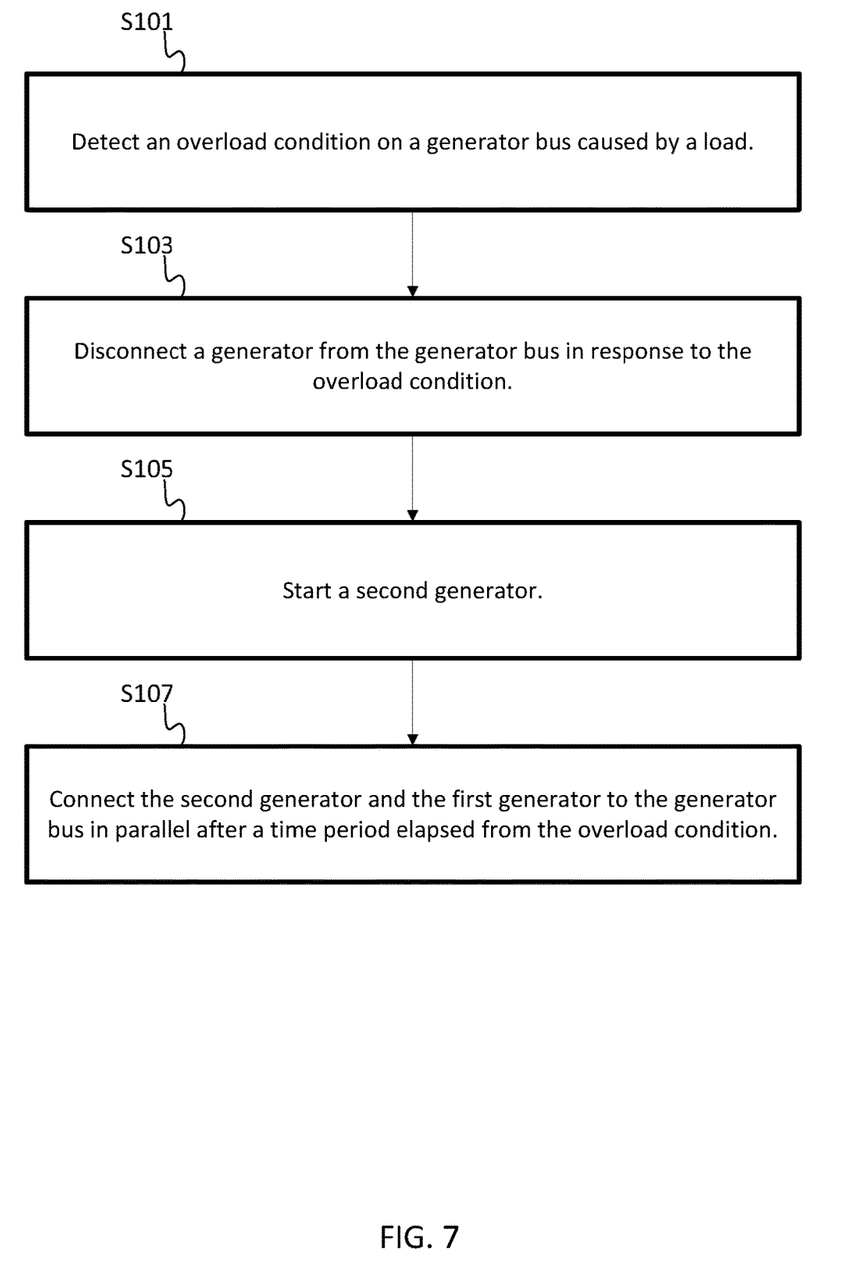
FIG. 7 illustrates example flowchart for bus recovery from overload condition.

FIG. 7 illustrates an example flowchart of the overload recovery operation for at least one of the controllers of FIGS. 1-5. The method in FIG. 7 may be described with respect to the controller 301, but any of the controllers may perform the acts of FIG. 7. The methods in FIG. 7 may, in some instances, be implemented as logic or software executable by a controller, such as controller 301. Additional, different, or fewer acts may be provided. The acts may be performed in the order shown or other orders. The acts may also be repeated.

At act S101, the controller 301 detects an overload condition on a generator bus caused by a load. The overload connection may be identified through a comparison of the loads connected to the generator bus and the capabilities of generators connector to the generator bus. The overload connection may be identified when a fuse or circuit breaker is tripped. The overload connection may be identified when the output of the generator passes a threshold. The threshold may be the rated power of the generator. Other events or sensors may trigger or indicate an overload condition.

At act S103, the controller 301 disconnects a first generator or first set of operating generators from the generator bus in response to the overload condition. In some examples, the controller 301 may disconnect all generators, operating or not, from the generator bus. The first generator runs during the overload condition after disconnecting from the generator bus. The alternator excitation may be removed from the first generator.

At act S105, the controller 301 starts a second generator (or set of generators). The controller 301 may monitor the second generator (or set of generators). The controller 301 may compare the output (e.g., voltage, current, power, frequency) of the second generator to a threshold.

At act S107, the controller 301 connects the second generator (or set of generators) and the first generator (or set of generators) to the generator bus in parallel when the threshold is reached for the second generator (or set of generators), the first generator (or set of generators), or both. A time period (e.g., 5-15 seconds) may elapse for the generators to reach rated levels. After, the time period, the first and second generators may supply power to the load that caused the overload condition. Accordingly, the load may experience a full loss in power for a relatively short time period, but the method may prevent a partial or total loss in power for a duration that exceeds the time period.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 302 may be a volatile memory or a non-volatile memory. The memory 302 may include one or more of a read only memory (ROM), random access memory (RAM), a flash memory, an electronic erasable program read only memory (EEPROM), or other type of memory. The memory 302 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The bus controller 200 and one or more generator controllers may be connected by a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 302 or database 307) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   detecting an overload condition on a generator bus caused by a load;
   disconnecting a first generator from the generator bus in response to the overload condition, wherein the first generator runs during the overload condition after disconnecting from the generator bus;
   starting, in response to the overload condition, a second generator without alternator excitation;
   removing, in response to the overload condition, alternator excitation from the first generator;
   connecting the first generator and the second generator to the generator bus connected to the load; and
   applying alternator excitation to the first generator and the second generator.

2. The method of claim 1, further comprising:
   determining whether the second generator is available, wherein the second generator is started in response to the second generator being available.

3. The method of claim 1, further comprising:
   identifying a power requirement of the load.

4. The method of claim 3, further comprising:
   selecting the second generator based on the power requirement of the load.

5. The method of claim 3, further comprising:
   comparing a capacity of the first generator to the power requirement of the load; and
   when the power requirement exceeds the capacity, generating an error signal.

6. The method of claim 5, further comprising:
   displaying a message based on the error signal to a user.

7. The method of claim 5, further comprising:
   disconnecting the first generator and the second generator from the generator bus in response to the error signal.

8. The method of claim 1, further comprising:
   receiving a circuit breaker signal indicative of the overload condition.

9. The method of claim 1, wherein the load exceeds the capacity of the first generator and the load is less than the sum of the capacity of the first generator and the capacity of the second generator.

10. An apparatus comprising:
    a sensing circuit configured to detect an overload condition caused by a load at a first generator; and
    a processor configured to generate a disconnection command to remove the first generator from a generator bus in response to the overload condition and generate an initiation command to start one or more additional generators, wherein the first generator and the one or more additional generators are synchronized and connected to the load,
    wherein the processor is configured to generate a first command message to remove alternator excitation from the first generator in response to the overload condition and a second command message to start a second generator without alternator excitation.

11. The apparatus of claim 10, wherein the processor is configured to generate a third command message to connect the first generator and the second generator to the generator bus.

12. The apparatus of claim 11, wherein the processor is configured to generate a fourth command message to connect the apply alternator excitation to the first generator and to the second generator.

13. The apparatus of claim 10, wherein the processor is configured to detect a power requirement of the load.

14. The apparatus of claim 13, wherein the processor is configured to select the second generator based on the power requirement of the load.

15. The apparatus of claim 13, wherein the processor is configured to compare a capacity of the first generator and the second generator to the power requirement of the load, and, when the power requirement exceeds the capacity, generate an error message.

16. The apparatus of claim 15, wherein the processor is configured to disconnect the first generator and the second generator from the generator bus in response to the error message.

17. The apparatus of claim 10, wherein the sensing circuit comprises a circuit breaker.

18. A method comprising:
    detecting an overload condition on a generator bus caused by a load;
    disconnecting a first generator from the generator bus in response to the overload condition, wherein the first generator runs during the overload condition after disconnecting from the generator bus;
    starting a second generator in response to the overload condition;
    removing alternator excitation from the first generator in response to the overload condition; and
    connecting the second generator and the first generator to the generator bus in parallel after a time period elapsed from the overload condition.

19. The method of claim 18, wherein a full loss in power during the time period prevents a partial loss in power for a duration that exceeds the time period.

* * * * *